(12) United States Patent
Naruse

(10) Patent No.: US 7,631,495 B2
(45) Date of Patent: Dec. 15, 2009

(54) HYDRAULIC DRIVE DEVICE FOR WORK MACHINE

(75) Inventor: Masami Naruse, Komatsu (JP)

(73) Assignee: Komatsu Ltd., Tokyo (JP)

( * ) Notice: Subject to any disclaimer, the term of this patent is extended or adjusted under 35 U.S.C. 154(b) by 182 days.

(21) Appl. No.: 11/579,363

(22) PCT Filed: Apr. 28, 2005

(86) PCT No.: PCT/JP2005/008199

§ 371 (c)(1),
(2), (4) Date: Nov. 2, 2006

(87) PCT Pub. No.: WO2005/108797

PCT Pub. Date: Nov. 17, 2005

(65) Prior Publication Data

US 2007/0227137 A1   Oct. 4, 2007

(30) Foreign Application Priority Data

May 7, 2004   (JP) .............................. 2004-138253

(51) Int. Cl.
*F15B 11/00*   (2006.01)
*E02F 9/22*   (2006.01)
(52) U.S. Cl. .......................................... 60/426; 60/434
(58) Field of Classification Search .................. 60/426, 60/434
See application file for complete search history.

(56) References Cited

U.S. PATENT DOCUMENTS

| | | | |
|---|---|---|---|
| 4,773,369 A * | 9/1988 | Kobayashi et al. .......... | 123/357 |
| 4,904,161 A * | 2/1990 | Kamide et al. ................ | 417/22 |
| 5,077,973 A | 1/1992 | Suzuki et al. | |
| 5,111,789 A * | 5/1992 | Moriya et al. ................ | 123/357 |
| 5,481,875 A | 1/1996 | Takamura et al. | |
| 5,527,156 A | 6/1996 | Song | |
| 5,638,677 A * | 6/1997 | Hosono et al. ................ | 60/431 |
| 5,878,721 A | 3/1999 | Nakamura | |
| 5,930,996 A | 8/1999 | Nakamura et al. | |
| 6,020,651 A | 2/2000 | Nakamura et al. | |
| 6,161,522 A | 12/2000 | Fuchita et al. | |
| 6,170,262 B1 * | 1/2001 | Yoshimura et al. ............ | 60/452 |
| 6,183,210 B1 * | 2/2001 | Nakamura ................ | 417/222.1 |
| 6,336,067 B1 | 1/2002 | Watanabe et al. | |

(Continued)

FOREIGN PATENT DOCUMENTS

EP   0 404 953 A1   1/1991

(Continued)

*Primary Examiner*—Thomas E Lazo
(74) *Attorney, Agent, or Firm*—Frishauf, Holtz, Goodman & Chick, P.C.

(57) ABSTRACT

To provide a hydraulic drive device for a work machine that is capable of ensuring reduction in fuel consumption even in actual work where an operating condition changes every moment. Operating condition identifying unit (41) for identifying the operating condition and hydraulic pump control system (40b) for controlling absorption torque of hydraulic pump (18) are provided. When the operating condition identified by operating condition identifying unit (41) is a specific operating condition, hydraulic pump control system (40b) controls the absorption torque of hydraulic pump (18) to achieve hydraulic pump absorption torque characteristic line (PLb) matching the absorption torque of hydraulic pump (18) with output torque of engine (17) at engine output torque point Mb at which a fuel consumption rate is substantially minimum.

16 Claims, 10 Drawing Sheets

U.S. PATENT DOCUMENTS

| | | |
|---|---|---|
| 6,339,737 B1 * | 1/2002 | Yoshimura et al. ............ 701/50 |
| 7,068,675 B1 | 6/2006 | Shitaya |
| 7,289,895 B2 | 10/2007 | Ishimoto et al. |
| 2006/0167607 A1 | 7/2006 | Nakamura et al. |
| 2006/0235595 A1 | 10/2006 | Sawada |
| 2007/0204604 A1 | 9/2007 | Naruse |

FOREIGN PATENT DOCUMENTS

| | | |
|---|---|---|
| EP | 1 655 469 A1 | 5/2006 |
| GB | 2 421 808 A | 7/2006 |
| JP | 02-038630 A | 2/1990 |
| JP | 4-194383 A | 7/1992 |
| JP | 05-086635 A | 4/1993 |
| JP | 08-218442 A | 8/1996 |
| JP | 10-205368 A | 8/1998 |
| JP | 11-002144 A | 1/1999 |
| JP | 11-107321 A | 4/1999 |
| JP | 11-293710 A | 10/1999 |
| JP | 2986471 B2 | 10/1999 |
| JP | 3064574 B2 | 5/2000 |
| JP | 2002-295408 A | 10/2002 |
| WO | WO 98/06936 A1 | 2/1998 |

* cited by examiner 10 (a)

10 (b)

10 (c)

ically in g/kw·h which is omitted in the following description) than that of matching point Mc' which is specified when the set engine speed is NA, so that the engine is used within a range of better fuel consumption rates while maintaining the same engine horsepower as matching point Mc'.
HYDRAULIC DRIVE DEVICE FOR WORK MACHINE This application is a U.S. National Phase Application under 35 USC 371 of International Application PCT/JP2005/008199 filed Apr. 28, 2005.

1. Technical Field

The present invention relates to a hydraulic drive device suitable for a work machine such as a hydraulic excavator.

2. Background Art

Known hydraulic drive devices of the above type are proposed by, for example, patent documents 1, 2 and 3. The hydraulic drive device of patent document 1 is configured to set an engine output torque characteristic and a hydraulic pump absorption torque characteristic that are suitable for a working mode selected by an operator. The hydraulic drive device of patent document 2 is configured to detect a certain operation status of, for example, an implement through detection of a certain operation status of an operating lever and set a maximum value of absorption torque of a hydraulic pump at a predetermined value in accordance with the implement's certain operation status when the implement is in that operation status. The hydraulic drive device of patent document 3 is configured to enable work with minimum fuel consumption in any of a plurality of working modes. As another related prior technique, patent document 4 proposes an engine control system for a construction machine.

Here, patent document 1 is Japanese Patent Unexamined Publication No. H02-38630, patent document 2 is Japanese Patent Unexamined Publication No. 2002-295408, patent document 3 is Japanese Patent No. 3,064,574, and patent document 4 is Japanese Patent Unexamined Publication No. H11-2144.

In the hydraulic drive device of patent document 1, when a heavy excavation mode is selected by the operator, an engine is operated at full load, and the engine output torque characteristic indicated by line ELa in FIG. 10(a) is set. This engine output torque characteristic line ELa has regulation line Ra set for set engine speed NA and is set such that output (horsepower) of the engine reaches a maximum at engine speed Na. At point Ma shown in the drawing, engine speed is specified by Na and output torque of the engine is specified by Ta. The hydraulic pump absorption torque characteristic indicated by line PLa in FIG. 10(a) is also set through adjustment of the amount of oil discharged from a variable displacement hydraulic pump (hereinafter simply referred to as "hydraulic pump"). This hydraulic pump absorption torque characteristic line PLa is set to be a monotone increasing function having engine speed as a variable. At point Ma, the output torque of the engine is matched with the absorption torque of the hydraulic pump. Such matching between the output torque of the engine and the absorption torque of the hydraulic pump is referred to as "matching", and point Ma in the drawing is referred to as matching point Ma. In the case of FIG. 10(a), matching point Ma coincides with the maximum horsepower point of the engine, so that the hydraulic pump absorbs the engine horsepower at matching point Ma, i.e., the maximum horsepower of the engine, thereby allowing high-efficiency heavy excavation work. A method of, for example, setting engine output torque Ta and engine speed Na at matching point Ma, as target values as described above and increasing and reducing the absorption torque of the hydraulic pump based on calculation of a difference between the target engine speed and an actual engine speed for matching the absorption torque of the hydraulic pump with the output torque of the engine at matching point Ma is called "engine speed sensing control" and is a publicly known technique.

When an excavation mode or a leveling mode is selected by the operator, the engine is brought into operation at partial load (partial operation), and the engine output torque characteristic indicated by line ELc in FIG. 10(b) is set in the above-mentioned hydraulic drive device. Engine output torque characteristic line ELc has regulation line Rc set for set engine speed NC. The hydraulic pump absorption torque characteristic indicated by line PLc in FIG. 10(b) is also set through the adjustment of the amount of oil discharged from the hydraulic pump. Here, the absorption torque of the hydraulic pump is controlled at values along an equivalent horsepower curve of the engine according to the set engine speed. A method of matching such absorption torque of the hydraulic pump with the output torque of the engine is called "equivalent horsepower control". In the case of FIG. 10(b), matching is done between the output torque of the engine and the absorption torque of the hydraulic pump at output torque point Mc specified by engine speed Nc and engine output torque Tc corresponding to engine speed Nc (Hereinafter, output torque point Mc is referred to as "matching point Mc"). This case allows the matching between the output torque of the engine and the absorption torque of the hydraulic pump at matching point Mc which has a lower fuel consumption rate (specified in g/kw·h which is omitted in the following description) than that of matching point Mc' which is specified when the set engine speed is NA, so that the engine is used within a range of better fuel consumption rates while maintaining the same engine horsepower as matching point Mc'.

In the hydraulic drive device of patent document 2, when, for example, the certain operation status of the operating lever is detected with the heavy excavation mode selected, the hydraulic pump absorption torque characteristic indicated by line PLd in FIG. 10(c) is set through the adjustment of the amount of oil discharged from the hydraulic pump. Here, the absorption torque of the hydraulic pump is kept constant. A method of matching such absorption torque of the hydraulic pump with the output torque of the engine is called "constant torque control". In the case of FIG. 10(c), matching is done between the output torque of the engine and the absorption torque of the hydraulic pump at output torque point Md specified by engine speed Nd and engine output torque Td corresponding to engine speed Nd (Hereinafter, output torque point Md is referred to as "matching point Md"). Setting the maximum value of the absorption torque of the hydraulic pump at matching point Md in accordance with the implement's certain operation status when the implement is in that operation status limits the hydraulic pump to an output required for the operation, thus reducing the total amount of fuel consumption at the time of light-load operation.

In the hydraulic drive device of patent document 3, a target output torque point which provides a minimum fuel consumption is set for each working mode, and the hydraulic pump is controlled to absorb the engine horsepower at the target output torque point corresponding to the working mode which is selected as a result of a working mode changeover performed by the operator, whereby fuel consumption can be reduced while the pump output required for the work is secured.

In the engine control system for the construction machine that is proposed by patent document 4, a pump controller calculates pump maximum absorption horsepower and pump required horsepower based on an accelerator opening degree, pump discharge pressures and the operating amounts of operating lever units, determines engine required horsepower by selecting the minimum value from the pump maximum absorption horsepower and the pump required horsepower and determines engine required speed by calculating pump required revolution speeds based on the accelerator opening degree, the operating amounts of the operating lever units and actual engine speed, while an engine controller determines required-horsepower-referenced target engine speed that corresponds to the engine required horsepower and provides the lowest fuel consumption rate. The engine controller then compares the required-horsepower-referenced target engine speed with the engine required speed to select one with higher speed for setting engine target speed. Based on this engine target speed the amount of fuel injection and fuel injection timing are controlled, thereby controlling the output torque and the speed of the engine. Under light-load conditions where the operating amount of the operating lever unit is small and a high engine speed is not required, this engine control system for the construction machine allows use of the engine in a range of low fuel consumption rates. On the other hand, under high-load conditions where the operating amount of the operating lever unit is large and the high engine speed is required, this engine control system gives priority to increasing the engine speed, thereby securing working efficiency.

DISCLOSURE OF THE INVENTION

Problems to be Solved by the Invention

In a job performed by a hydraulic excavator, required pump outputs vary greatly, for example, between work which involves excavating earth, scooping up the excavated earth with a bucket, swinging an upper structure while lifting a boom and then loading a dump truck with the earth from the bucket and work that follows the earth loading and involves swinging the upper structure while lowering the boom for the next work cycle.

If the above-mentioned series of operations is carried out in the case of FIG. 10(a) where the heavy excavation mode is selected, the hydraulic drive device of patent document 1 operates the engine in the vicinity of output torque point Ma. This means that even when an operating condition not requiring much output from the hydraulic pump is active during that series of operations, the engine is used in the vicinity of engine speed Na at which the fuel consumption rate is relatively high, thus problematically resulting in unnecessary fuel consumption. Moreover, it is substantially impossible for the operator to switch between the heavy excavation mode of FIG. 10(a) and the excavation mode (or leveling mode) of FIG. 10(b) according to the operating condition which changes every moment during the above series of operations, so that the fuel consumption cannot be reduced to a sufficient degree in the actual work where the operating condition changes momentarily.

When the above-mentioned series of operations is carried out, the hydraulic drive device of patent document 2 limits the output of the hydraulic pump according to the change of operating condition as shown in FIG. 10(c), thereby restraining the consumption of unnecessary energy. However, the engine is operated within a range of fuel consumption rates (between engine speeds NA and Nd) along regulation line Ra during the series of operations. This problematically causes poor fuel efficiency.

In the hydraulic drive device of patent document 3, the target output torque point providing the minimum fuel consumption is changed by the operator's working mode changeover, so that changing the target output torque point providing the minimum fuel consumption according to the operating condition which changes momentarily during the above-mentioned series of operations is substantially impossible. For this reason, the fuel consumption cannot be reduced to a sufficient degree in the actual work where the operating condition changes every moment.

The engine control system for the construction machine that is proposed by patent document 4 allows the use of the engine in the range of low fuel consumption rates under the light-load conditions where the operating amount of the operating lever unit is small and the high engine speed is not required. Under the high-load conditions where the operating amount of the operating lever unit is large and the high engine speed is required, this engine control system gives priority to increasing the engine speed to secure the working efficiency. However, this engine control system has the following problem. Steep changes in the operating amount of the operating lever unit involve frequent changes in engine speed. In such a situation, the implement does not respond to the increase and decrease in engine speed, thus not responding well to an operating feeling of the operator.

The present invention addresses the problems discussed above and aims to provide a hydraulic drive device for a work machine that is capable of ensuring reduction in fuel consumption even in actual work where an operating condition changes every moment.

MEANS FOR SOLVING THE PROBLEMS

To achieve the above object, a hydraulic drive device for a work machine according to a first aspect of the present invention includes:

an engine;

a hydraulic pump driven by the engine;

a hydraulic actuator operated by pressure oil discharged from the hydraulic pump;

operating condition identifying means for identifying operating conditions; and hydraulic pump controlling means for controlling absorption torque of the hydraulic pump, wherein when the operating condition identifying means identifies a specific operating condition of the operating conditions, the hydraulic pump controlling means controls the absorption torque of the hydraulic pump to match the absorption torque of the hydraulic pump with output torque of the engine at a specified engine output torque point at which a fuel consumption rate of the engine is substantially minimum.

According to a second aspect of the present invention that is based on the first aspect, it is preferable that the operating condition identifying means includes at least one of operation status detecting means for detecting an operation status of the hydraulic actuator and discharge pressure detecting means for detecting discharge pressure of the hydraulic pump and identifies the operating conditions based on at least one of a detection result provided by the operation status detecting means and a detection result provided by the discharge pressure detecting means.

According to a thirst aspect of the present invention that is based on the first or second aspect, it is preferable that the hydraulic pump controlling means gradually performs switching between a first hydraulic pump absorption torque characteristic matching the absorption torque of the hydraulic pump with the output torque of the engine at the specified engine output torque point and a different hydraulic pump absorption torque characteristic matching the absorption torque of the hydraulic pump with the output torque of the engine at an engine output torque point different from the specified engine output torque point.

According to a fourth aspect of the present invention that is based on the first, second or third aspect, it is preferable that throttle controlling means is further included for controlling an engine speed under a no-load condition and that when the hydraulic pump controlling means performs switching between a first hydraulic pump absorption torque characteristic matching the absorption torque of the hydraulic pump with the output torque of the engine at the specified engine output torque point and a different hydraulic pump absorption torque characteristic matching the absorption torque of the hydraulic pump with the output torque of the engine at an engine output torque point different from the specified engine output torque point, the throttle controlling means changes, in synchronization with the switching, the engine speed under the no-load condition according to a difference between an engine speed corresponding to the specified engine output torque point and an engine speed corresponding to the different engine output torque point.

Advantages of the Invention

According to the first aspect of the invention, the operating condition not requiring much output from the hydraulic pump, for example, is set as the specific operating condition, and the operating condition identifying means identifies the actual operating condition during actual work where the operating condition changes every moment. When the operating condition identifying means identifies the specific operating condition, the absorption torque of the hydraulic pump is controlled by the hydraulic pump controlling means to be matched with the output torque of the engine at the specified engine output torque point at which the fuel consumption rate of the engine is substantially minimum. Reduction in fuel consumption can thus be ensured even in the actual work where the operating condition changes momentarily.

Adopting the second aspect of the invention can facilitate and ensure the identification of the momentarily changing operating condition.

According to the third aspect of the invention, the switching between the absorption torque characteristics of the hydraulic pump is performed gradually, so that a steep change in the engine speed and a steep change in the amount of oil discharged from the hydraulic pump are controlled, whereby, for example, impact on the hydraulic actuator and others can be eased.

Adopting the fourth aspect of the invention can reduce noise during the actual work.

DESCRIPTION OF REFERENCE MARKS IN THE DRAWINGS

| | |
|---|---|
| 1 | hydraulic excavator |
| 17 | engine |
| 18 | hydraulic pump |
| 20 | hydraulic actuator |
| 22 | engine controller |
| 24 | pump controller |
| 25 | speed sensor |
| 28 | solenoid operated proportional control valve |
| 29 | pressure sensor |
| 37 | hydraulic switch |
| 38 | potentiometer |
| 39 | monitor panel |
| 40 | engine/hydraulic pump control system |
| 40a | engine control system |
| 40b | hydraulic pump control system |
| 41 | operating condition identifying unit |
| 42 | pump absorption torque command controller |
| 43 | control current command controller |
| 44 | throttle command controller |
| EL | engine output torque characteristic line |
| PLb | hydraulic pump absorption torque characteristic line |
| Mb | matching point |
| Fm | fuel consumption map |

DETAILED DESCRIPTION OF THE PREFERRED EMBODIMENT

A concrete exemplary embodiment of a hydraulic drive device for a work machine according to the present invention is demonstrated hereinafter with reference to the accompanying drawings. The present embodiment is an example in which the invention is applied in a hydraulic excavator as the work machine.

Figure 1:
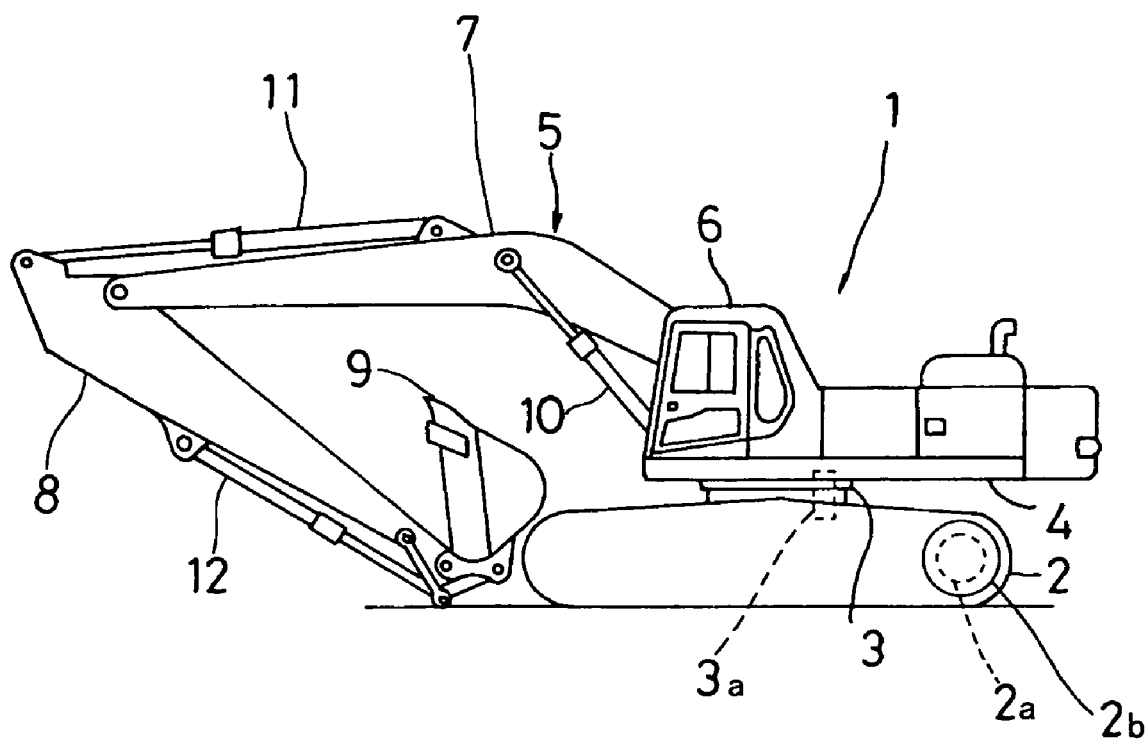
FIG. 1 is a side view of a hydraulic excavator in accordance with an exemplary embodiment of the present invention.
Figure 2:
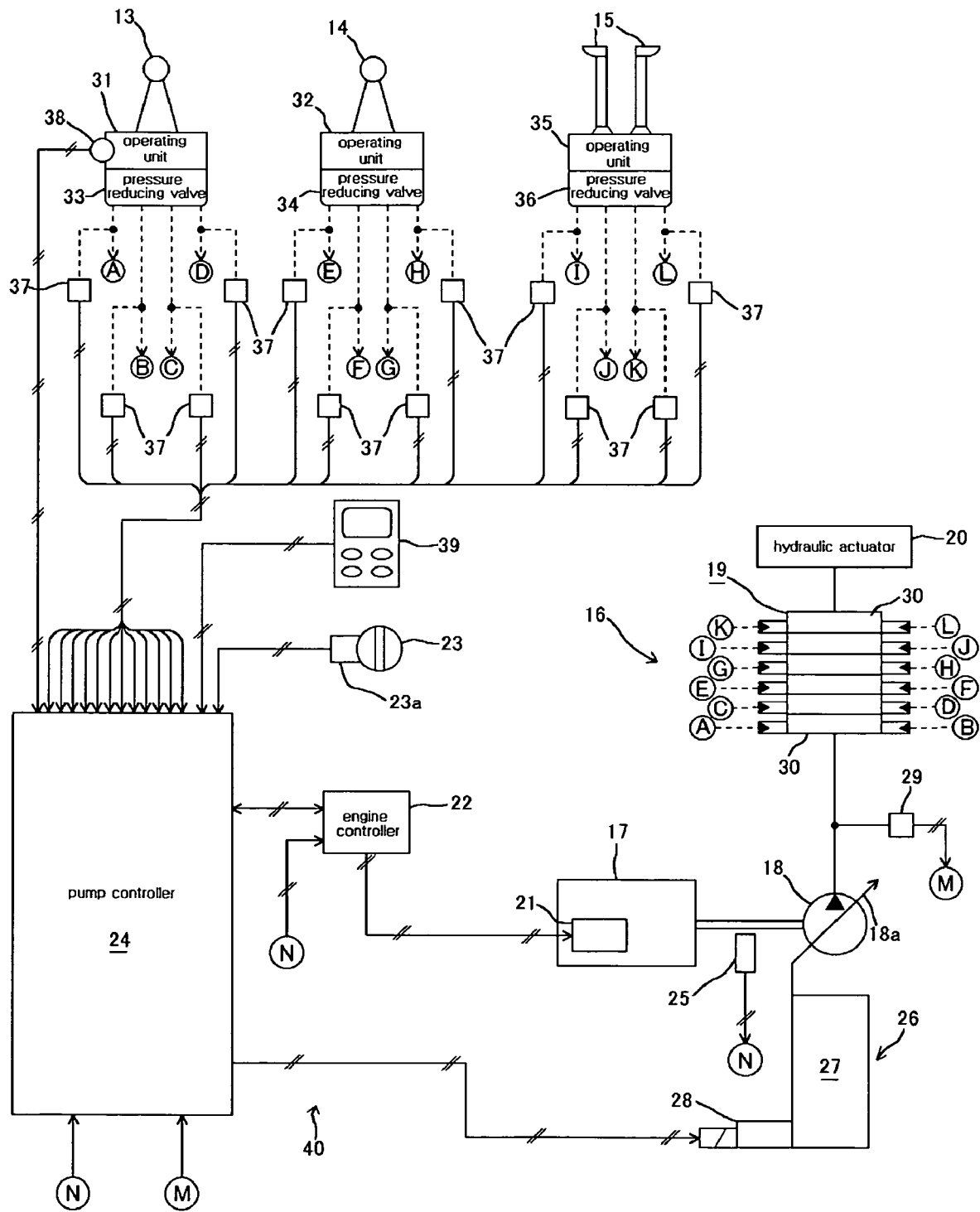
FIG. 2 schematically shows a general system configuration of a hydraulic drive device in accordance with the embodiment.
Figure 3:
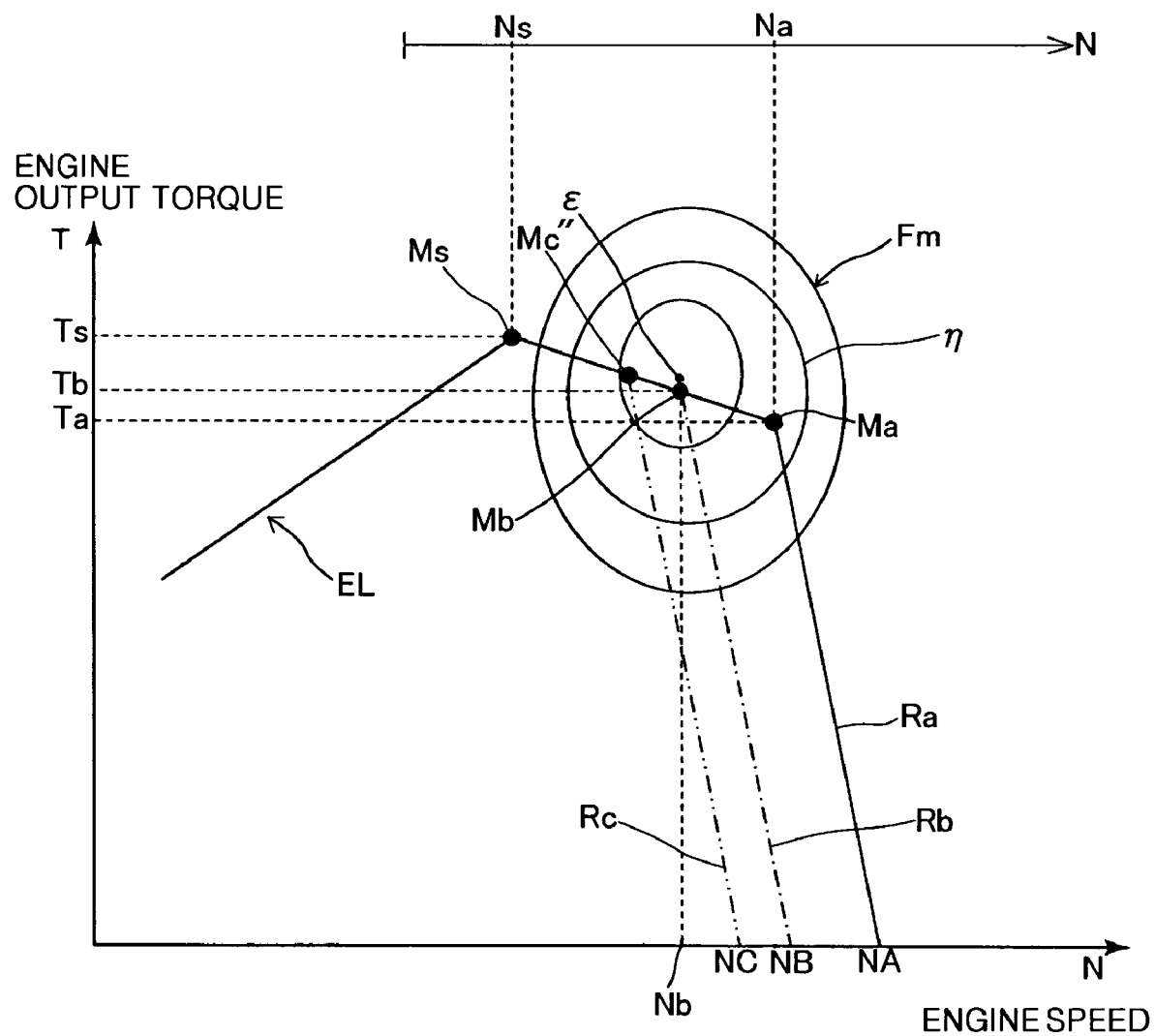
FIG. 3 shows an engine output torque characteristic line in accordance with the embodiment.
Figure 4:
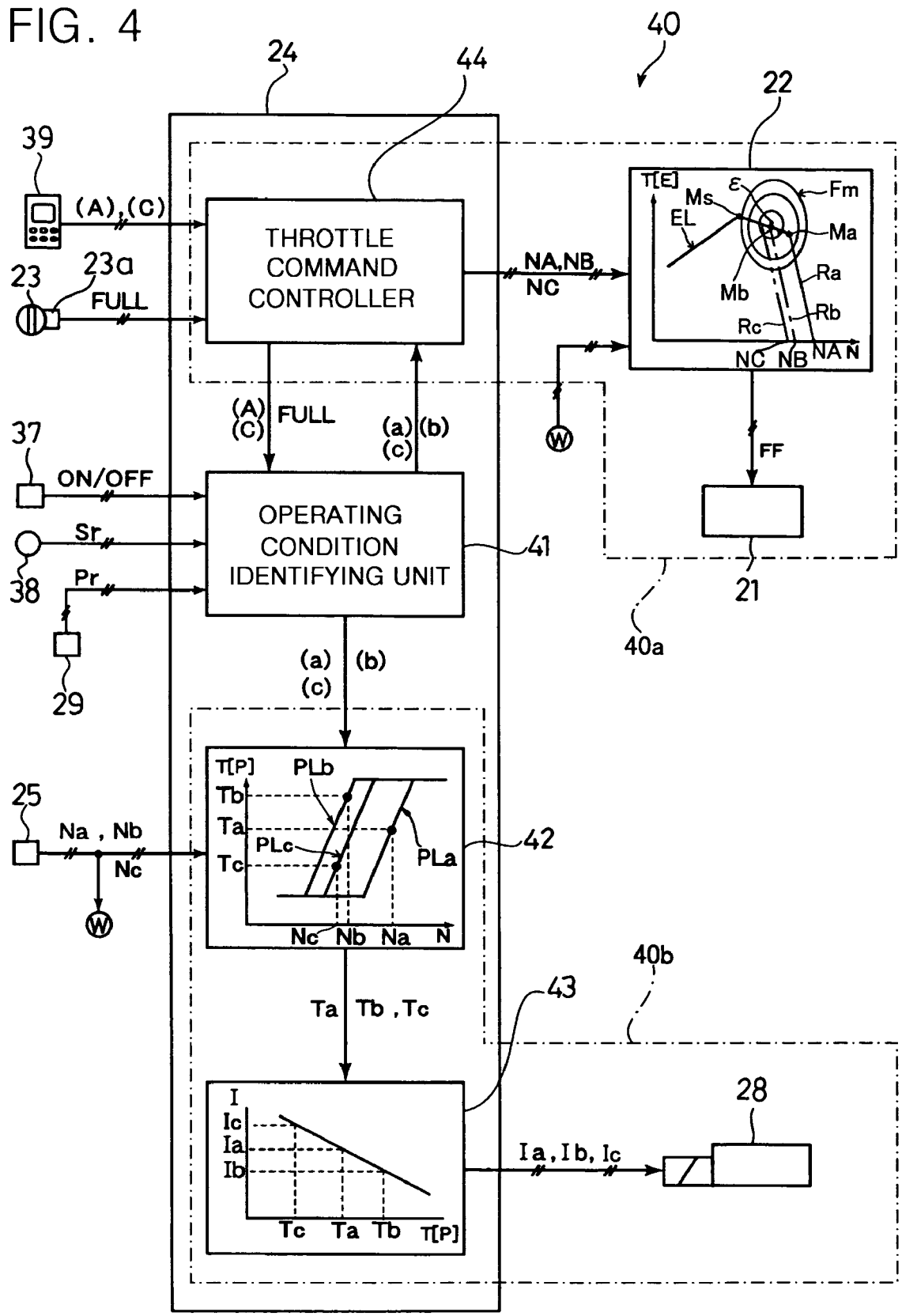
FIG. 4 is a functional block diagram of an engine/hydraulic pump control system in accordance with the embodiment.

FIG. 1 is a side view of the hydraulic excavator in accordance with the exemplary embodiment of the invention, and FIG. 2 schematically shows a general system configuration of the hydraulic drive device in accordance with the present embodiment. FIG. 3 shows an engine output torque characteristic line in accordance with the embodiment, and FIG. 4 is a functional block diagram of an engine/hydraulic pump control system in accordance with the embodiment.

As shown in FIG. 1, hydraulic excavator 1 of the present embodiment is constructed of undercarriage 2 including travel device 2b driven by hydraulic motor 2a for travel, swing device 3 driven by hydraulic motor 3a for swings, upper structure 4 disposed above undercarriage 2 via swing device 3, implement 5 attached to a central front position of upper structure 4, and operator's cab 6 provided at a left front position of upper structure 4. Implement 5 is formed of boom 7, arm 8 and bucket 9 that are pivotally connected in this order from the side of upper structure 4, and hydraulic cylinders (boom cylinder 10, arm cylinder 11 and bucket cylinder 12) are disposed to correspond to boom 7, arm 8 and bucket 9, respectively. In operator's cab 6, implement operating levers 13, 14 (see FIG. 2) are disposed on both sides of an operator's seat (not shown in the drawing) for operating swinging motions of upper structure 4 and flexing/up-and-down motions of implement 5, while a pair of travel operating levers 15, 15 (see FIG. 2) are disposed in front of the operator's seat for operating traveling motions of undercarriage 2.

Hydraulic circuit 16 such as shown in FIG. 2 is incorporated in hydraulic excavator 1. This hydraulic circuit 16 is designed to feed and discharge operating pressure oil discharged from hydraulic pump 18 driven by engine 17 to and from hydraulic actuator 20 (comprised of boom cylinder 10, arm cylinder 11, bucket cylinder 12, hydraulic motor 2a for traveling and hydraulic motor 3a for swinging) through operating valve 19. Through operation of this hydraulic circuit 16, the flexing/up-and-down motions of implement 5, the swinging motions of upper structure 4 and the traveling motions of undercarriage 2 are carried out.

Engine 17 is a diesel engine. This engine 17 is preset with fuel consumption map Fm expressed by equivalent fuel consumption curves η shown in FIG. 3 as well as the engine output torque characteristic indicated by line EL in FIG. 3. When a set engine speed (engine speed under a no-load condition) is NA, engine output torque characteristic line EL includes regulation line Ra set for this set engine speed NA. When the set engine speed is NB (which is lower than NA), engine output torque characteristic line EL includes regulation line Rb set for set engine speed NB. When the set engine speed is NC (which is lower than NB), engine output torque characteristic line EL includes regulation line Rc set for set engine speed NC. When the set engine speed is set to be NA for engine output torque characteristic line EL, output torque of engine 17 reaches a maximum at output torque point Ms which is specified by engine speed Ns and output torque Ts of engine 17 that corresponds to engine speed Ns, output (horsepower) of engine 17 reaches a maximum at output torque point Ma which is specified by engine speed Na and output torque Ta of engine 17 that corresponds to engine speed Na, and a fuel consumption rate becomes substantially minimum at output torque point Mb (corresponding to "specified engine output torque point" in the invention) which is specified by specified engine speed Nb between engine speeds Ns and Na and output torque Tb of engine 17 that corresponds to specified engine speed Nb. Point E in FIG. 3 is a point indicative of the lowest fuel consumption rate.

As shown in FIG. 2, engine 17 is provided with accumulator (common rail) type fuel injection system 21. This fuel injection system 21 itself is publicly known and is therefore not illustrated in detail in the drawing. This system 21 is configured to store fuel under pressure in a common rail by means of a fuel transfer pump and inject the fuel from an injector by opening and closing of a solenoid-controlled valve. A fuel injection characteristic is determined by a drive signal sent from engine controller 22 to the solenoid-controlled valve, and desired injection characteristics can be obtained for all speeds of engine 17 ranging from a low speed range to a high speed range. In the present embodiment, a so-called electronically controlled injection system is configured to include fuel injection system 21, engine controller 22 and various sensors. In this electronically controlled injection system, a target injection characteristic is mapped by digital values, whereby the engine output torque characteristic such as shown in FIG. 3 can be obtained. For setting a throttling amount of engine 17, fuel dial 23 is provided, and potentiometer 23a is provided to fuel dial 23 for outputting a throttle signal (hereinafter referred to as "first throttle signal") to pump controller 24. Speed sensor 25 detects an actual speed of engine 17 and outputs a resulting detection signal to engine controller 22 and pump controller 24. In place of common rail type fuel injection system 21, a fuel injection system equipped with a mechanical governor or another type of fuel injection system equipped with an electronic governor may be adopted.

Hydraulic pump 18 is a variable displacement hydraulic pump provided with electro-hydraulic servo mechanism 26. This electro-hydraulic servo mechanism 26 is composed of regulator 27 for regulating a pivot angle of swash plate 18a of hydraulic pump 18 by means of the pressure oil discharged from hydraulic pump 18, and solenoid operated proportional control valve 28 for controlling regulator 27 based on control current from pump controller 24. Pump controller 24 outputs the control current value which is used for controlling the pivot angle of swash plate 18a of hydraulic pump 18 to solenoid operated proportional control valve 28 for the purpose of increasing or reducing absorption torque of hydraulic pump 18 according to a difference between an engine speed read which has been set based on the above-mentioned first throttle signal sent from potentiometer 23a of fuel dial 23 and a working mode command signal sent from monitor panel 39 (described later) and the actual engine speed read from the actual engine speed signal sent from speed sensor 25. For detecting discharge pressure of hydraulic pump 18, pressure sensor 29 is provided. This pressure sensor 29 outputs a pump discharge pressure signal to pump controller 24.

Operating valve 19 is a collection of hydraulic pilot controlled directional control valves 30 corresponding to hydraulic actuator 20 (hydraulic motor 2a for traveling, hydraulic motor 3a for swinging, boom cylinder 10, arm cylinder 11 and bucket cylinder 12). Pilot pressure oils output from pressure reducing valves 33, 34, 36 (described later) are supplied to these directional control valves 30 for specified oil path switches.

Implement operating levers 13, 14 are provided with respective pressure reducing valves 33, 34 via respective operating units 31, 32 which output various operation commands corresponding to respective lever operations. Similarly, travel operating levers 15, 15 are provided with pressure reducing valve 36 via operating unit 35 which outputs various operation commands corresponding to respective lever operations. Each of pressure reducing valves 33, 34, 36 is supplied with the pilot pressure oil from a pilot pump not shown in the drawing, regulates the supplied pilot pressure oil based on the operation command and outputs the regulated pilot pressure oil to operating valve 19. The pilot pressure oils output from pressure reducing valves 33, 34, 36 are input to specified pilot pressure oil input ports of operating valve 19, whereby the specified oil path switches are performed. In this way, the swinging motions of upper structure 4 and the flexing/up-and-down motions of implement 5 are achieved in response to the specified operations of implement operating levers 13, 14, and the traveling motions of undercarriage 2 are achieved in response to the specified operations of travel operating levers 15, 15. Operation signals indicative of respective operation statuses of implement levers 13, 14 and travel operating levers 15, 15 are input to pump controller 24 through respective hydraulic switches 37 provided to pressure reducing valves 33, 34, 36. In the present embodiment, those operation signals input to pump controller 24 in response to the specified operations of operating levers 13, 14, 15, 15 total twelve signals which are:

(1) a right swing operation signal corresponding to the right swinging motion of upper structure 4;

(2) a left swing operation signal corresponding to the left swinging motion of upper structure 4;

(3) a boom-up operation signal corresponding to the upward motion of boom 7;

(4) a boom-down operation signal corresponding to the downward motion of boom 7;
(5) an arm dumping operation signal corresponding to the forward motion of arm 8;
(6) an arm excavating operation signal corresponding to the retracting motion of arm 8;
(7) a bucket dumping operation signal corresponding to the forward motion of bucket 9;
(8) a bucket excavating operation signal corresponding to the retracting motion of bucket 9;
(9) a right forward travel operation signal corresponding to the right forward traveling motion of undercarriage 2;
(10) a right backward travel operation signal corresponding to the right backward traveling motion of undercarriage 2;
(11) a left forward travel operation signal corresponding to the left forward traveling motion of undercarriage 2; and
(12) a left backward travel operation signal corresponding to the left backward traveling motion of undercarriage 2.

Operating unit 31 is provided with potentiometer 38 for outputting operating amounts of implement operating lever 13 that are associated with the respective arm dumping, arm excavating, bucket dumping and bucket excavating operations in the form of respective electric signals, i.e., an arm dump operating amount signal, an arm excavation operating amount signal, a bucket dump operating amount signal and a bucket excavation operating amount signal. These operating amount signals are input from potentiometer 38 to pump controller 24.

Operator's cab 6 has monitor panel 39 functioning as a setting unit for allowing an operator to select a desired working mode from a plurality of working modes. In the present embodiment, a description is provided of a heavy excavation mode and an economy mode as the two selectable working modes for the sake of convenience.

The hydraulic drive device of this embodiment is provided with engine/hydraulic pump control system 40 mainly comprised of engine controller 22, pump controller 24, various sensors and switches 25, 29, 37, 38, various setting units 23, 39 and various actuators 21, 28. Referring to the functional block diagram of FIG. 4, a detailed description is hereinafter provided of this engine/hydraulic pump control system 40.

Pump controller 24 is composed of operating condition identifying unit 41 (which corresponds to "operating condition identifying means" in the invention), pump absorption torque command controller 42, control current command controller 43 and throttle command controller 44 (which corresponds to "throttle controlling means" in the invention).

The first throttle signal from potentiometer 23a provided to fuel dial 23 and the working mode command signal from monitor panel 39 are input to operating condition identifying unit 41 through throttle command controller 44 (described later). Operating condition identifying unit 41 also receives the operation signals from respective hydraulic switches 37, the operating amount signals from potentiometer 38 provided to operating unit 31 and the pump discharge pressure signal from pressure sensor 29. Operating condition identifying unit 41 identifies the present operating condition based on these input signals and outputs an identification result in the form of an operating condition signal (a), (b) or (c) to pump absorption torque command controller 42 and throttle command controller 44. An operating condition identifying procedure of operating condition identifying unit 41 is detailed later. It is to be noted here that operating condition (b), which is described later, corresponds to "specific operating condition" in the invention.

Pump absorption torque command controller 42 receives the actual engine speed signal from speed sensor 25 and the operating condition signal from operating condition identifying unit 41. This pump absorption torque command controller 42 also stores a plurality of mapped hydraulic pump absorption torque characteristics preset based on the operating conditions and the working modes. Each of the hydraulic pump absorption torque characteristics is a correlation between the torque absorbed from engine 17 by hydraulic pump 18 (hereinafter simply referred to as "absorption torque") and the engine speed. In the present embodiment, the hydraulic pump absorption torque characteristic indicated by line PLa in the drawing is preset to correspond to operating condition (a) and the heavy excavation mode, while the hydraulic pump absorption torque characteristic indicated by line PLb in the drawing is preset to correspond to operating condition (b). To correspond to operating condition (c), the hydraulic pump absorption torque characteristic indicated by line PLc in the drawing is preset. The present embodiment has these three hydraulic pump absorption torque characteristics preset, but the hydraulic pump absorption torque characteristics may not be limited to this number. Alternatively, more hydraulic pump absorption torque characteristics may be preset based on the operating conditions and the working modes.

Pump absorption torque command controller 42 outputs a pump absorption torque command value which is determined based on the hydraulic pump absorption torque characteristic line selected based on the operating condition signal and the working mode command signal and the actual engine speed signal sent from speed sensor 25. For example, if operating condition signal (a) and actual engine speed signal (Na) are received from operating condition identifying unit 41 and speed sensor 25, respectively, hydraulic pump absorption torque characteristic line PLa is selected, and pump absorption torque value Ta corresponding to actual engine speed signal (Na) is output as the pump absorption torque command value. If operating condition signal (b) and actual engine speed signal (Nb) are received from operating condition identifying unit 41 and speed sensor 25, respectively, hydraulic pump absorption torque characteristic line PLb is selected, and pump absorption torque value Tb corresponding to actual engine speed signal (Nb) is output as the pump absorption torque command value. If operating condition signal (c) and actual engine speed signal (Nc) are received from operating condition identifying unit 41 and speed sensor 25, respectively, hydraulic pump absorption torque characteristic line PLc is selected, and pump absorption torque value Tc corresponding to actual engine speed signal (Nc) is output as the pump absorption torque command value.

Control current command controller 43 receives the pump absorption torque command value from pump absorption torque command controller 42. This control current command controller 43 also stores the control current values corresponding to the respective pump absorption torque command values for output to solenoid operated proportional control valve 28. Control current command controller 43 determines the control current value based on the pump absorption torque command value from pump absorption torque command controller 42 and outputs this control current value to solenoid operated proportional control valve 28. If, for example, pump absorption torque command value Ta is received from pump absorption torque command controller 42, control current value Ia corresponding to pump absorption torque command value Ta is output to solenoid operated proportional control valve 28. If pump absorption torque command value Tb is received from pump absorption torque command controller 42, control current value Ib corresponding to pump absorption torque command value Tb is output to solenoid operated proportional control valve 28. If pump absorption torque command value Tc is received from pump absorption torque command controller 42, control current value Ic corresponding to pump absorption torque command value Tc is output to solenoid operated proportional control valve 28.

It is to be noted that control current command controller 43 is capable of modulation. Thus, this controller 43 gradually increases the control current value over fixed period of time $\Delta t_B$ (between times $t_5$ and $t_6$) for switching the control current value from Ia to Ib and gradually decreases the control current value over fixed period of time $\Delta t_A$ (between times $t_3$ and $t_4$) for switching the control current value from Ib to Ia (see FIG. 9). In the present embodiment, $\Delta t_A > \Delta t_B$. In cases where the economy mode is selected with monitor panel 39 provided inside operator's cab 6, control current command controller 43 outputs control current value Ic to solenoid operated proportional control valve 28 (not illustrated).

Figure 5:
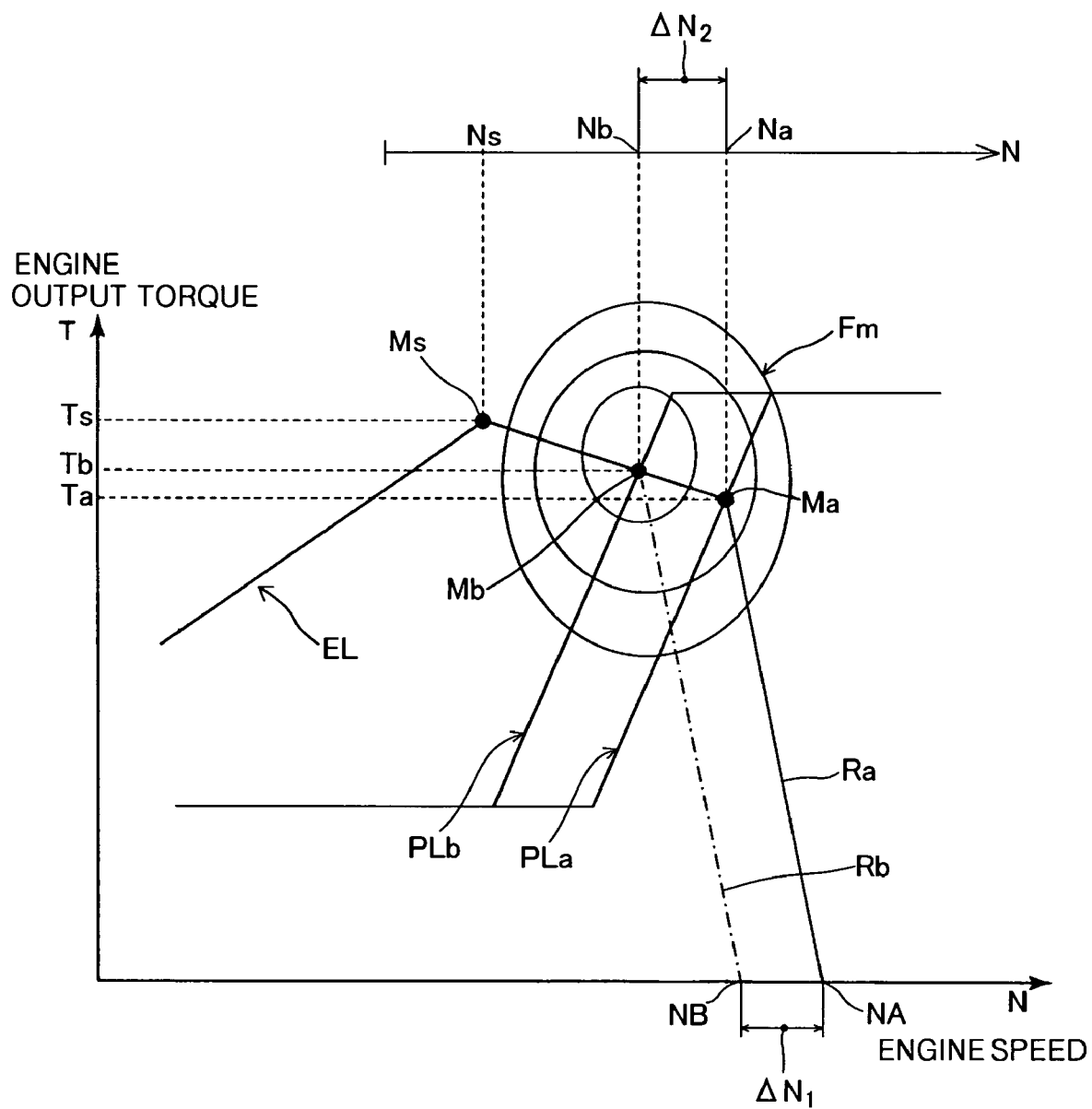
FIG. 5 is a first characteristic line diagram illustrating relationships between the engine output torque characteristic and hydraulic pump absorption torque characteristics.
Figure 6:
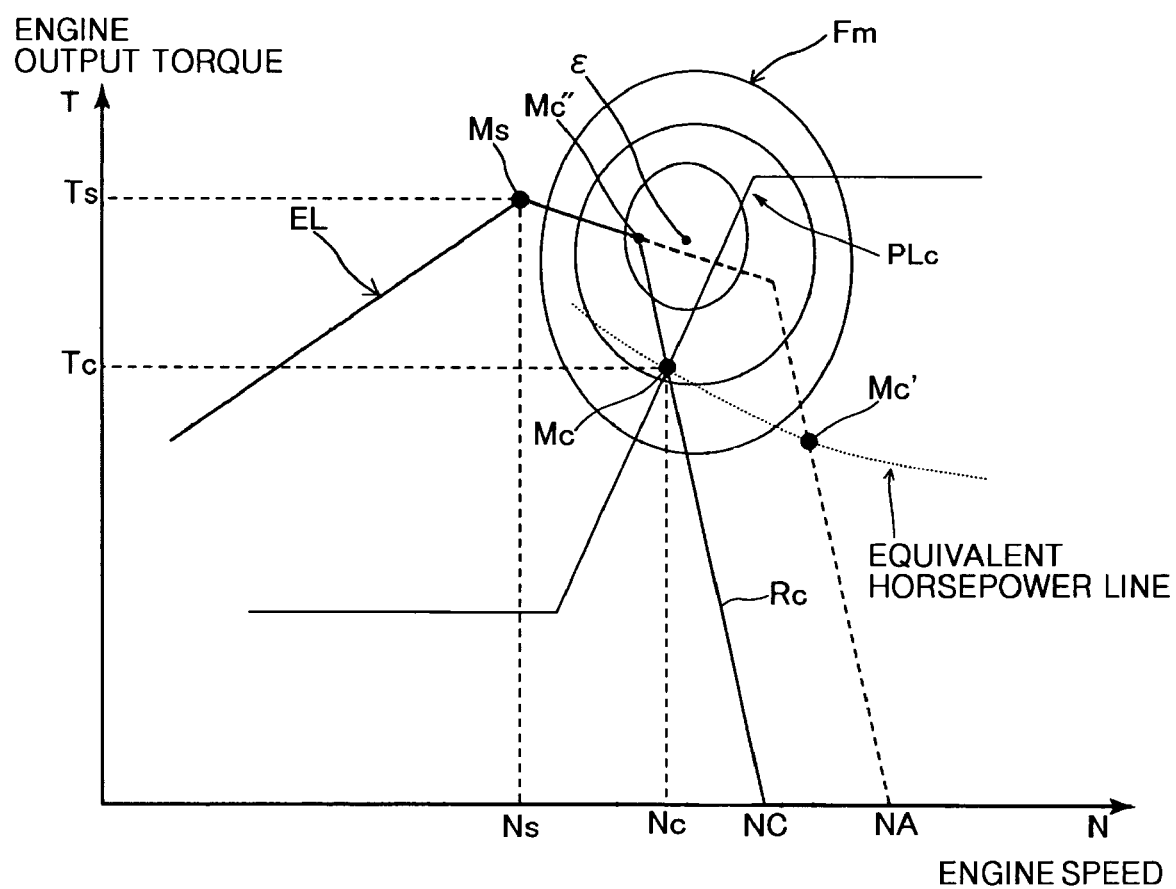
FIG. 6 is a second characteristic line diagram illustrating a relationship between the engine output torque characteristic and a hydraulic pump absorption torque characteristic.

When operating condition identifying unit 41 identifies operating condition (a), as shown in FIG. 5, output torque characteristic EL of engine 17 is set to be characteristic line Ms-Ma-NA having output torque points Ms, Ma, and hydraulic pump absorption torque characteristic line PLa is selected, whereby the absorption torque of hydraulic pump 18 is increased with increase in the engine speed and reduced with decrease in the engine speed to be matched with the output torque of engine 17 at output torque point Ma (Hereinafter, such a condition is referred to as "matching"). When operating condition identifying unit 41 identifies operating condition (b), hydraulic pump absorption torque characteristic line PLb is selected, whereby the absorption torque of hydraulic pump 18 is increased with increase in the engine speed and reduced with decrease in the engine speed for matching with the output torque of engine 17 at output torque point Mb as shown in FIG. 5. In this case, it is preferable that the engine speed under the no-load condition is decreased from NA to NB for noise reduction. When the economy mode is selected (i.e. when operating condition identifying unit 41 identifies operating condition (c)), as shown in FIG. 6, output torque characteristic EL of engine 17 is set to be characteristic line Ms-Mc"—NC having output torque points Ms, Mc", and hydraulic pump absorption torque characteristic line PLc is selected, whereby the absorption torque of hydraulic pump 18 is increased with increase in the engine speed and reduced with decrease in the engine speed to be matched with the output torque of engine 17 at output torque point Mc located on regulation line Rc set for set engine speed NC. In the following description, output torque points Ma, Mb and Mc are referred to as "matching points Ma, Mb and Mc", respectively.

Figure 7:
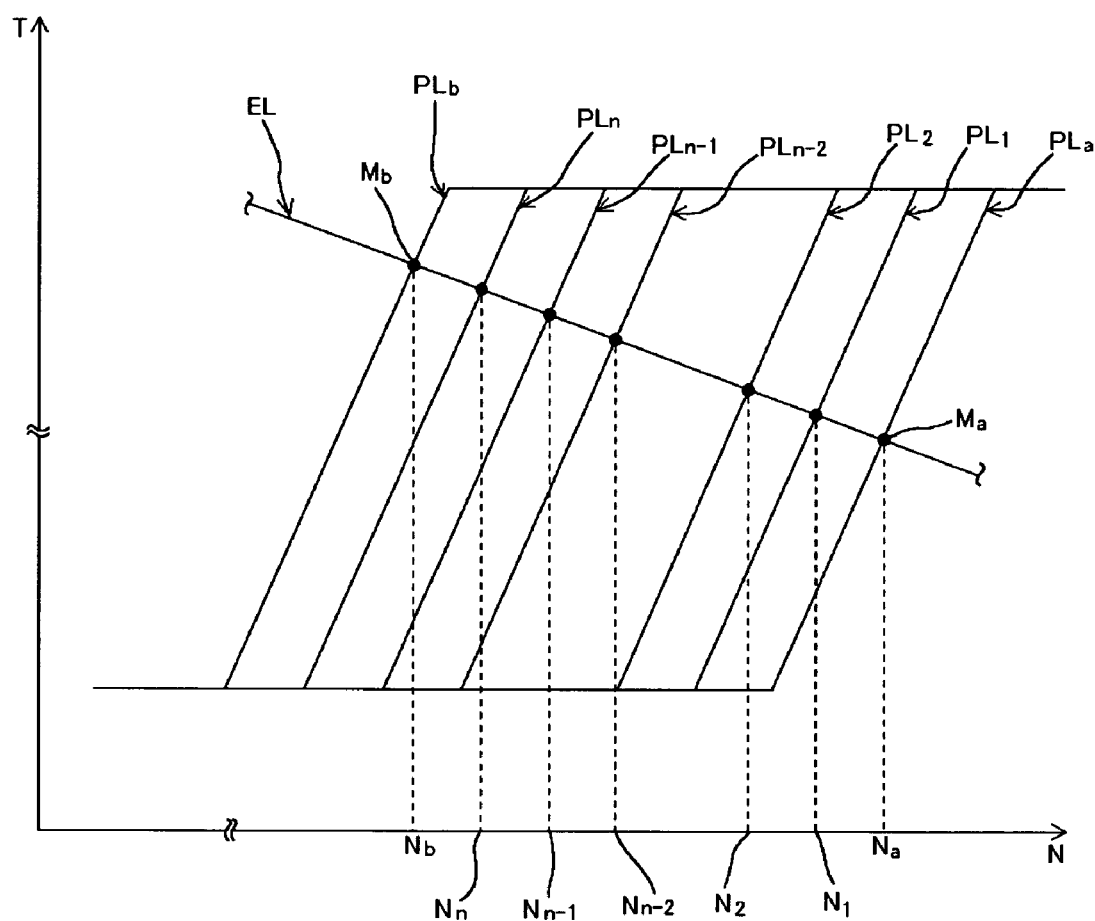
FIG. 7 illustrates changes in the hydraulic pump absorption torque characteristic line.
Figure 9:
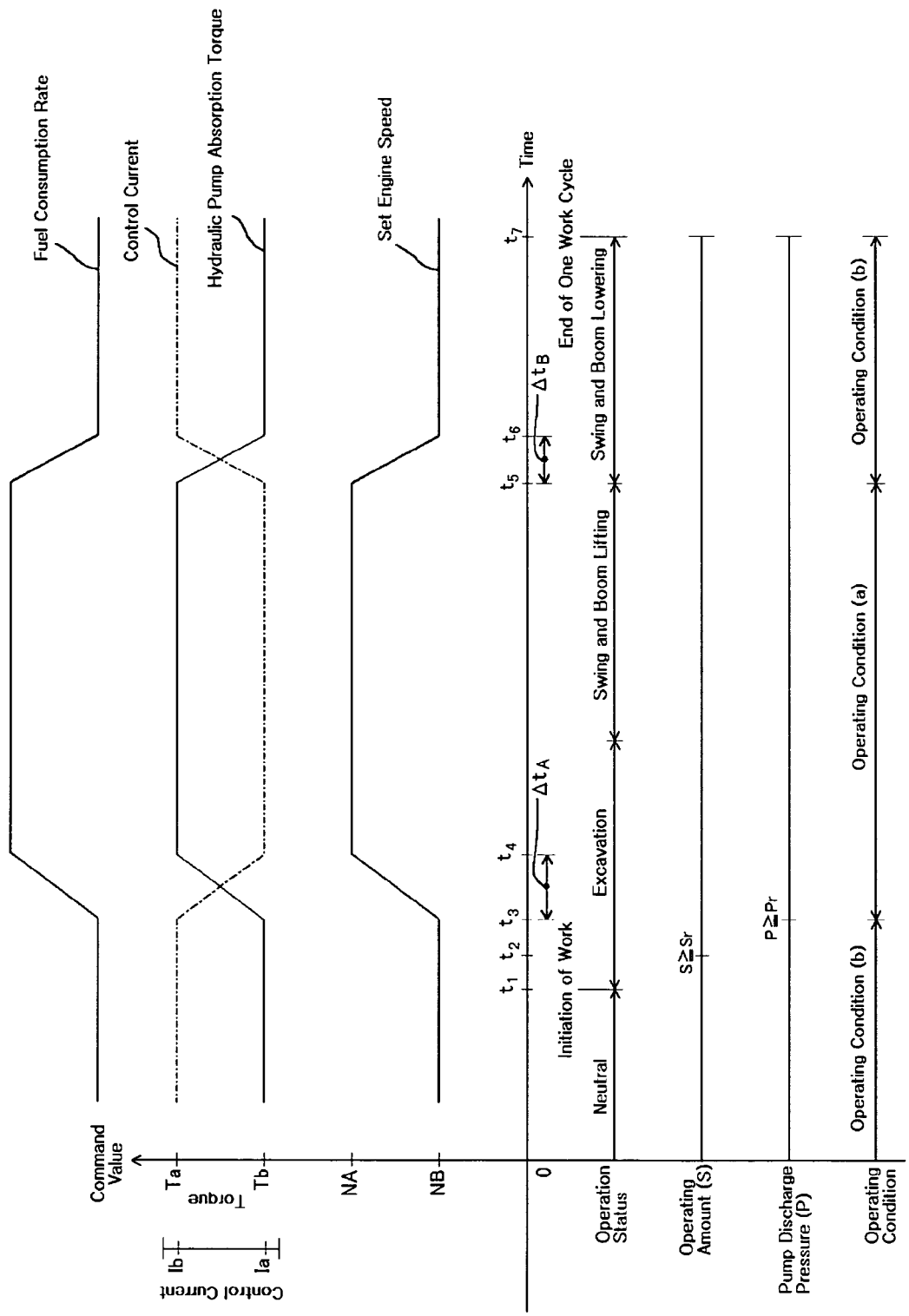
FIG. 9 is a time chart illustrating changes in set engine speed, changes in hydraulic pump absorption torque and fuel consumption rate changes in one example of work.
Figure 10:
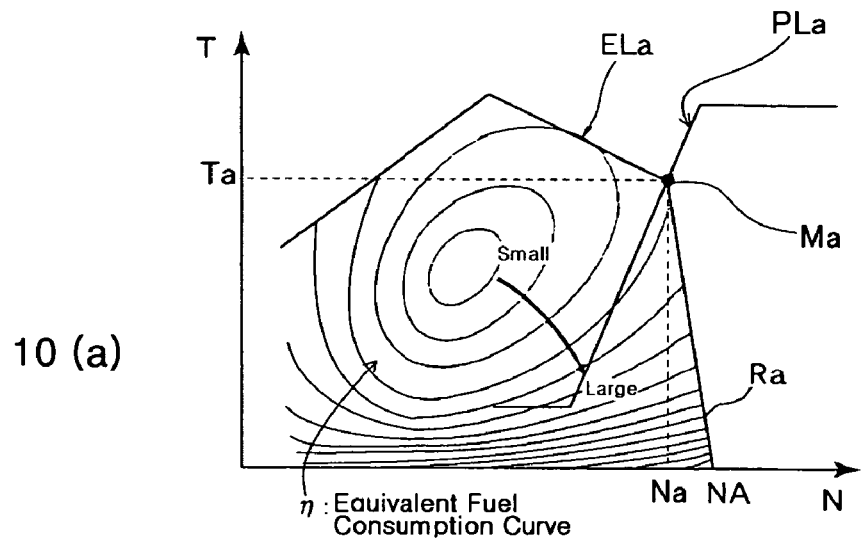
FIG. 10 illustrates prior techniques.
Figure 10:
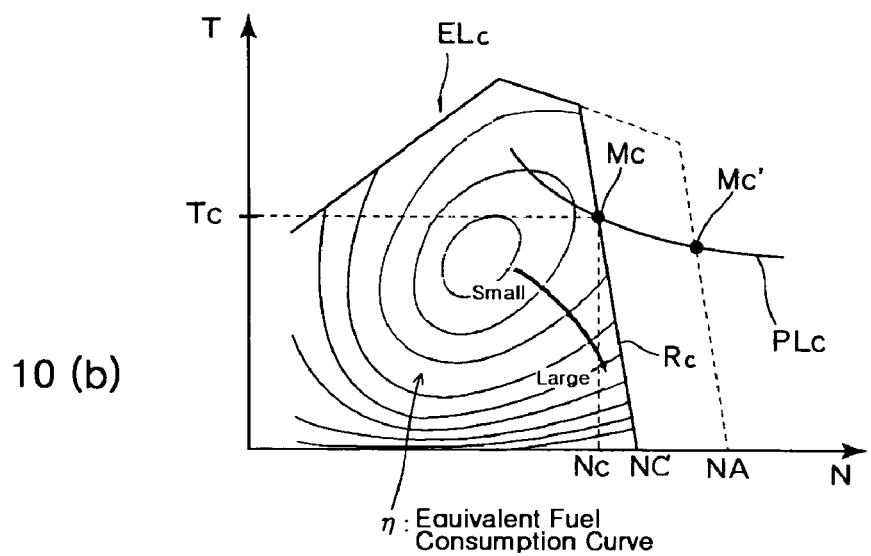
Figure 10:
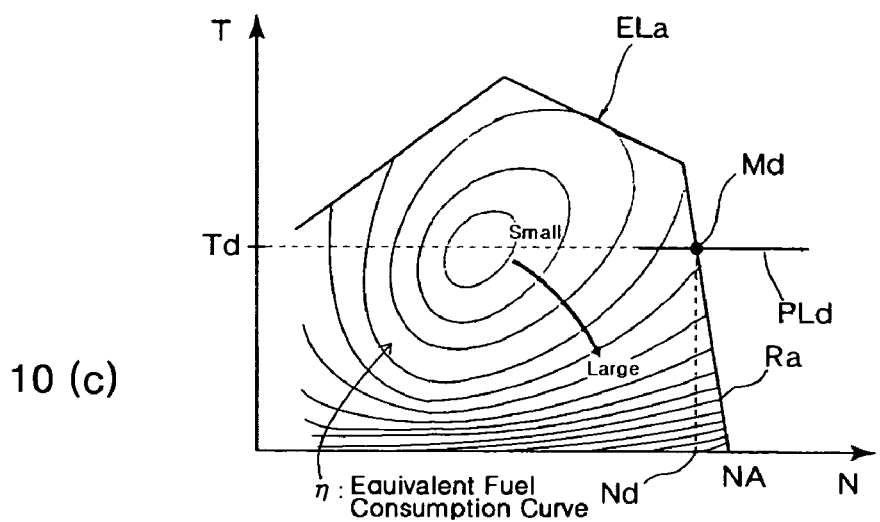

When an operating condition identified by operating condition identifying unit 41 changes from operating condition (a) to operating condition (b) during actual work where the operating condition changes every moment, as shown in FIG. 7, matching target engine speed (target engine speed at which the absorption torque of hydraulic pump 18 is matched with the output torque of engine 17) is shifted from Na to Nb over fixed period of time $\Delta t_B$ (which is between times $t_5$ and $t_6$ and shown in FIG. 9) by way of $N_1, N_2, \ldots N_{n-2}, N_{n-1}$ and $N_n$. In conjunction with this shift, the hydraulic pump absorption torque characteristic line is shifted from PLa to PLb by way of $PL_1, PL_2, \ldots PL_{n-2}, PL_{n-1}$ and $PL_n$. When the operating condition identified by operating condition identifying unit 41 changes from operating condition (b) to operating condition (a), as shown in FIG. 7, the matching target engine speed is shifted from Nb to Na over fixed period of time $\Delta t_A$ (which is between times $t_3$ and $t_4$ as shown in FIG. 9) by way of $N_n$, $N_{n-1}, N_{n-2}, \ldots N_2$ and $N_1$, and in conjunction with this shift, the hydraulic pump absorption torque characteristic line is shifted from PLb to PLa by way of $PL_n, PL_{n-1}, PL_{n-2}, \ldots PL_2$ and $PL_1$.

Throttle command controller 44 receives the working mode command signal from monitor panel 39, the first throttle signal from potentiometer 23a of fuel dial 23 and the operating condition signal from operating condition identifying unit 41. This throttle command controller 44 determines a second throttle signal based on these input signals and outputs the determined second throttle signal to engine controller 22. With the fuel dial set in a widest position (full position), first throttle signal (FULL) whose magnitude indicates set engine speed NA is input to throttle command controller 44. In this case, if the working mode command signal input to throttle command controller 44 is heavy excavation mode command signal (A), throttle command controller 44 outputs to engine controller 22 second throttle signal (NA) whose magnitude indicates set engine speed NA. If the working mode command signal input to throttle command controller 44 is economy mode command signal (C) with fuel dial 23 set in the same position as the above case, throttle command controller 44 outputs to engine controller 22 second throttle signal (NC) whose magnitude indicates set engine speed NC.

In cases where first throttle signal (FULL), heavy excavation mode command signal (A) and operating condition signal (a) are input to throttle command controller 44, throttle command controller 44 outputs second throttle signal (NA) to engine controller 22. In cases where first throttle signal (FULL), heavy excavation mode command signal (A) and operating condition signal (b) are input to throttle command controller 44, throttle command controller 44 outputs to engine controller 22 second throttle signal (NB) whose magnitude indicates set engine speed NB.

It is to be noted here that difference $\Delta N_1$ between set engine speed NA and set engine speed NB is set according to difference $\Delta N_2$ between engine speed Na corresponding to matching point Ma and engine speed Nb corresponding to matching point Mb (In this embodiment, $\Delta N_1 = \Delta N_2$). When the absorption torque characteristic line of hydraulic pump 18 is shifted from hydraulic pump absorption torque characteristic line PLa to hydraulic pump absorption torque characteristic line PLb, throttle command controller 44 gradually decreases the second throttle signal from (NA) to (NB) in synchronization with this shift. When the absorption torque characteristic line of hydraulic pump 18 is shifted from hydraulic pump absorption torque characteristic line PLb to hydraulic pump absorption torque characteristic line PLa, throttle command controller 44 gradually increases the second throttle signal from (NB) to (NA) in synchronization with that shift.

Engine controller 22 receives the second throttle command signal from throttle command controller 44. This engine controller 22 also stores the mapped engine output torque characteristic shown in FIG. 3. Engine controller 22 determines the present amount of fuel injection based on the engine output torque characteristic map, the second throttle command signal, the actual engine speed signal from speed sensor 25, the fuel injection characteristic map (not shown in the drawing) and others for injection performed by fuel injection system 21 and outputs to fuel injection system 21 drive signal (FF) satisfying the determined amount of fuel injection.

It should be noted here that in engine/hydraulic pump control system 40 of the present embodiment, engine control system 40a which includes throttle command controller 44, engine controller 22 and fuel injection system 21 is configured to control engine 17, and hydraulic pump control system 40b (corresponding to "hydraulic pump controlling means" in the invention) which includes pump absorption torque command controller 42, control current command controller 43 and solenoid operated proportional control valve 28 is configured to control the absorption torque of hydraulic pump 18.

Figure 8:
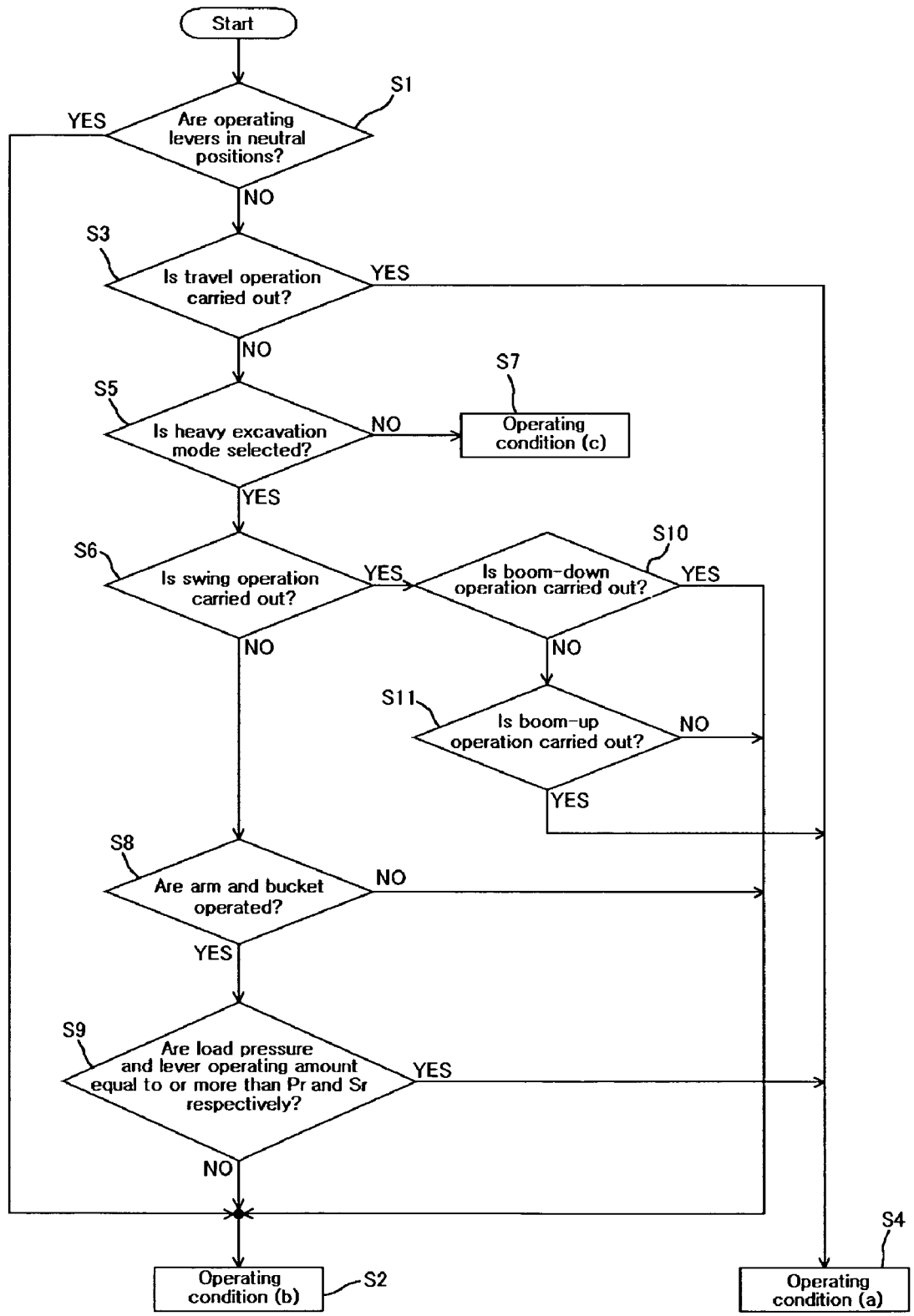
FIG. 8 is a flowchart of a procedure for identifying an operating condition.

Referring to a flowchart of FIG. 8, a description is provided next of the operating condition identifying procedure of operating condition identifying unit 41. In the drawing, reference marks S denote steps.

Steps S1 to S7: A determination is made as to whether implement operating levers 13, 14 and travel operating levers 15, 15 are in neutral positions (S1). If implement operating levers 13, 14 and travel operating levers 15, 15 are in the neutral positions, operating condition (b) is identified (S2). If it is determined that implement operating levers 13, 14 and travel operating levers 15, 15 are not in the neutral positions, a determination is made as to whether the travel operation is carried out (S3). If it is determined that the travel operation is carried out, operating condition (a) is identified (S4). If it is determined that the travel operation is not carried out, a determination is made as to whether the working mode is the heavy excavation mode (S5). If the working mode is the heavy excavation mode, a determination is made as to whether the swing operation of upper structure 4 is carried out (S6). If it is determined that the working mode is not the heavy excavation mode, but the economy mode, operating condition (c) is identified (S7).

Steps S8 to S9: If it is determined in the step S6 that the swing operation of upper structure 4 is not carried out, a determination is made as to whether arm 8 and bucket 9 are operated (S8). If it is determined that arm 8 and bucket 9 are not operated, operating condition (b) is identified (S2). If arm 8 and bucket 9 are operated, a determination is made as to whether discharge pressure (load pressure) P of hydraulic pump 18 is equal to or more than specified pressure Pr and operating amount S of the lever associated with the operation of arm 8 and bucket 9 is equal to or more than specified amount Sr (S9). If $P \geq Pr$ and $S \geq Sr$, operating condition (a) is identified (S4). If $P<Pr$ and $S<Sr$, operating condition (b) is identified (S2).

Steps S10 to S11: If it is determined in step S6 that the swing operation of upper structure 4 is carried out, a determination is made as to whether the boom-down operation of boom 7 is carried out (S10). If the boom-down operation of boom 7 is carried out, operating condition (b) is identified (S2). If the boom-down operation of boom 7 is not carried out, a determination is made as to whether the boom-up operation of boom 7 is carried out (S11). If the boom-up operation of boom 7 is not carried out, operating condition (b) is identified (S2). If the boom-up operation of boom 7 is carried out, operating condition (a) is identified (S4).

In cases where operating condition (c) is identified as the present operating condition in step S7, as shown in FIG. 6, engine 17 is brought into partial operation (operation at partial load), regulation line Rc is set, hydraulic pump absorption torque characteristic line PLc is set, and the absorption torque of hydraulic pump 18 is matched with the output torque of engine 17 at matching point Mc which has a lower fuel consumption rate than that of point Mc' shown in the drawing, whereby engine 17 is operated within in a range of better fuel efficiency while maintaining the same engine horsepower as point Mc'. It goes without saying that matching at point Mc" shown in FIG. 6 is also possible in the case of operating condition (c). However, the matching is done at matching point Mc in this embodiment for light-load operation to reduce the total amount of fuel consumption.

Referring to FIGS. 5 and 9, a description is provided hereinafter of operation of the hydraulic drive device of the present embodiment in one example of work performed by hydraulic excavator 1. This example of work involves, in one cycle, excavating earth, scooping up the excavated earth with bucket 9, swinging upper structure 4 while lifting boom 7, loading a dump truck with the earth from bucket 9 and then swinging upper structure 4 while lowering boom 7 to return to the initial state. Also, this example of work is done on precondition that:

(1) hydraulic excavator 1 performs the work in a fixed position;
(2) fuel dial 23 is set in the full position; and
(3) the heavy excavation mode is selected.

At time $t_1$, the work begins with the excavation of the earth. Before and soon after the initiation of the work, operating condition identifying unit 41 identifies operating condition (b). Accordingly, engine 17 is operated based on set engine speed NB, and hydraulic pump 18 is operated based on hydraulic pump absorption torque characteristic line PLb. While the pump discharge pressure is low because of light load, engine 17 is operated along regulation line Rb according to the magnitude of the load. Increase in the pump load pressure leads to the absorption torque of hydraulic pump 18 being matched with the output torque of engine 17 at matching point Mb at which the fuel consumption rate is substantially minimum, whereby the total amount of unnecessary fuel consumption is reduced.

At time $t_2$, the operating amount of the lever associated with the operation of arm 8 and bucket 9 is detected as being equal to or more than specified amount Sr, and at time $t_3$, the discharge pressure (load pressure) of hydraulic pump 18 is detected as being equal to or more than specified pressure Pr. Accordingly, operating condition identifying unit 41 identifies operating condition (a) at time $t_3$. Based on this identification result, modulation is effected to switch the hydraulic pump absorption torque characteristic line from PLb to PLa. In synchronization with this switch, modulation is effected to switch the set engine speed from NB to NA. As a result of these switches, the output torque of engine 17 is matched with the absorption torque of hydraulic pump 18 at matching point Ma. This means that hydraulic pump 18 absorbs the engine horsepower at matching point Ma, whereby high-efficiency earth excavating motion and high-efficiency swinging/boom-up motion are carried out.

At the moment the swinging/boom-up motion changes to swinging/boom-down motion at time $t_5$, operating condition identifying unit 41 identifies operating condition (b). Based on this identification result, modulation is effected to switch the hydraulic pump absorption torque characteristic line from PLa to PLb. In synchronization with this switch, modulation is effected to switch the set engine speed from NA to NB. As a result of these switches, the output torque of engine 17 is matched with the absorption torque of hydraulic pump 18 at matching point Mb at which the fuel consumption rate is substantially minimum, whereby the swinging/boom-down motion is carried out with the fuel consumption rate of engine 17 being substantially minimum.

According to the present embodiment, when operating condition identifying unit 41 identifies operating condition (b), the matching is done between the output torque of engine 17 and the absorption torque of hydraulic pump 18 at matching point Mb at which the fuel consumption rate is substantially minimum, so that fuel consumption can be reduced without fail even in the above-described example of work where the operating condition changes every moment. Moreover, the modulation is effected for the switch between hydraulic pump absorption torque characteristic lines PLa, PLb, and in synchronization with this switch, the switching is performed between set engine speeds NA, NB for engine 17. A steep change in the engine speed and a steep change in the pivot angle of swash plate 18$a$ of hydraulic pump 18 are thus controlled, whereby, for example, impact on hydraulic actuator 20 and others can be eased. Furthermore, the set engine speed is decreased from NA to NB in conjunction with the switching of the absorption torque characteristic line of hydraulic pump 18 from PLa to PLb. This allows the noise reduction even in the above-described example of work where the operating condition changes momentarily.

The invention claimed is:

1. A hydraulic drive device for a hydraulic excavator, the hydraulic excavator including a travel device, travel operating levers for operating the travel device, a swing device, a work implement and implement operating levers for operating the swing device and the implement, the hydraulic drive device comprising:
   an engine;
   a hydraulic pump driven by the engine;
   a hydraulic actuator operated by pressure oil discharged from the hydraulic pump, the hydraulic actuator driving the travel device, the swing device and the implement;
   operating condition identifying means for identifying operating conditions of the hydraulic excavator; and
   hydraulic pump controlling means for controlling absorption torque of the hydraulic pump;
   wherein when the operating condition identifying means identifies a specific operating condition wherein the implement operating levers and the travel operating levers are in neutral positions, the hydraulic pump controlling means controls the absorption torque of the hydraulic pump to match an output torque of the engine at a specified engine output torque point at which a fuel consumption rate of the engine is at a minimum.

2. The hydraulic drive device for a hydraulic excavator according to claim 1,
   wherein the operating condition identifying means comprises at least one of operation status detecting means for detecting operation status of the hydraulic actuator and discharge pressure detecting means for detecting discharge pressure of the hydraulic pump; and
   wherein the operating condition identifying means identifies the operating conditions based on at least one of a detection result provided by the operation status detecting means and a detection result provided by the discharge pressure detecting means.

3. The hydraulic drive device for a hydraulic excavator according to claim 1,
   wherein the hydraulic pump controlling means gradually performs switching between a first hydraulic pump absorption torque characteristic and a second, different hydraulic pump absorption torque characteristic, the first hydraulic pump absorption torque characteristic matching the absorption torque of the hydraulic pump with the output torque of the engine at the specified engine output torque point, the second hydraulic pump absorption torque characteristic matching the absorption torque of the hydraulic pump with the output torque of the engine at an engine output torque point different from the specified engine output torque point.

4. The hydraulic drive device for a hydraulic excavator according to claim 1, further comprising:
   throttle controlling means for controlling an engine speed under a no-load condition,
   wherein when the hydraulic pump controlling means switches between a first hydraulic pump absorption torque characteristic matching the absorption torque of the hydraulic pump with the output torque of the engine at the specified engine output torque point and a second, different hydraulic pump absorption torque characteristic matching the absorption torque of the hydraulic pump with the output torque of the engine at an engine output torque point different from the specified engine output torque point, the throttle controlling means changes, in synchronization with the switching, the engine speed under the no-load condition according to a difference between an engine speed corresponding to the specified output torque point and an engine speed corresponding to the different engine output torque point.

5. A hydraulic drive device for a hydraulic excavator, the hydraulic excavator including a travel device, travel operating levers for operating the travel device, a swing device, a work implement and implement operating levers for operating the swing device and the implement, the hydraulic drive device comprising:
   an engine;
   a hydraulic pump driven by the engine;
   a hydraulic actuator operated by pressure oil discharged from the hydraulic pump, the hydraulic actuator driving the travel device, the swing device and the implement;
   operating condition identifying means for identifying operating conditions of the hydraulic excavator; and
   hydraulic pump controlling means for controlling absorption torque of the hydraulic pump;
   wherein when the operating condition identifying means identifies a specific operating condition that satisfies the following operating characteristics (1) to (5), the hydraulic pump controlling means controls the absorption torque of the hydraulic pump to match an output torque of the engine at a specified engine output torque point at which a fuel consumption rate of the engine is minimum:
   (1) the implement operating levers and the travel operating levers are not in neutral positions,
   (2) a travel operation is not carried out,
   (3) a working mode is a heavy excavation mode,
   (4) a swing operation of upper structure is carried out by means of the swing device, and
   (5) a boom-down operation of a boom of the implement is carried out.

6. The hydraulic drive device for a hydraulic excavator according to claim 5, wherein:
   the operating condition identifying means comprises at least one of operation status detecting means for detecting an operation status of the hydraulic actuator and discharge pressure detecting means for detecting discharge pressure of the hydraulic pump; and
   the operating condition identifying means identifies the operating conditions based on at least one of a detection result provided by the operation status detecting means and a detection result provided by the discharge pressure detecting means.

7. The hydraulic drive device for a hydraulic excavator according to claim 5,
   wherein the hydraulic pump controlling means gradually performs switching between a first hydraulic pump absorption torque characteristic and a second, different hydraulic pump absorption torque characteristic, the first hydraulic pump absorption torque characteristic matching the absorption torque of the hydraulic pump with the output torque of the engine at the specified engine output torque point, the second hydraulic pump absorption torque characteristic matching the absorption torque of the hydraulic pump with the output torque of the engine at an engine output torque point different from the specified engine output torque point.

8. The hydraulic drive device for a hydraulic excavator according to claim 5, further comprising:

throttle controlling means for controlling an engine speed under a no-load condition, wherein when the hydraulic pump controlling means performs switching between a first hydraulic pump absorption torque characteristic matching the absorption torque of the hydraulic pump with the output torque of the engine at the specified engine output torque point and a second, different hydraulic pump absorption torque characteristic matching the absorption torque of the hydraulic pump with the output torque of the engine at an engine output torque point different from the specified engine output torque point, the throttle controlling means changes, in synchronization with the switching, the engine speed under the no load condition according to a difference between an engine speed corresponding to the specified output torque point and an engine speed corresponding to the different engine output torque point.

9. A hydraulic drive device for a hydraulic excavator, the hydraulic excavator including a travel device, travel operating levers for operating the travel device, a swing device, a work implement and implement operating levers for operating the swing device and the implement, the hydraulic drive device comprising:

an engine;

a hydraulic pump driven by the engine;

a hydraulic actuator operated by pressure oil discharged from the hydraulic pump, the hydraulic actuator driving the travel device, the swing device and the implement;

operating condition identifying means for identifying operating conditions of the hydraulic excavator; and hydraulic pump controlling means for controlling absorption torque of the hydraulic pump;

wherein when the operating condition identifying means identifies a specific operating condition that satisfies the following operating characteristics (1) to (5), the hydraulic pump controlling means controls the absorption torque of the hydraulic pump to match an output torque of the engine at a specified engine output torque point at which a fuel consumption rate of the engine is minimum:

(1) the implement operating levers and the travel operating levers are not in neutral positions,
(2) a travel operation is not carried out,
(3) a working mode is a heavy excavation mode,
(4) a swing operation of upper structure is not carried out by means of the swing device, and
(5) an arm and a bucket of the implement are not operating.

10. The hydraulic drive device for a hydraulic excavator according to claim 9, wherein:

the operating condition identifying means comprises at least one of operation status detecting means for detecting an operation status of the hydraulic actuator and discharge pressure detecting means for detecting discharge pressure of the hydraulic pump; and the operating condition identifying means identifies the operating conditions based on at least one of a detection result provided by the operation status detecting means and a detection result provided by the discharge pressure detecting means.

11. The hydraulic drive device for a hydraulic excavator according to claim 9, wherein the hydraulic pump controlling means gradually performs switching between a first hydraulic pump absorption torque characteristic and a second, different hydraulic pump absorption torque characteristic, the first hydraulic pump absorption torque characteristic matching the absorption torque of the hydraulic pump with the output torque of the engine at the specified engine output torque point, the second hydraulic pump absorption torque characteristic matching the absorption torque of the hydraulic pump with the output torque of the engine at an engine output torque point different from the specified engine output torque point.

12. The hydraulic drive device for a hydraulic excavator according to claim 9, further comprising:

throttle controlling means for controlling an engine speed under a no-load condition, wherein when the hydraulic pump controlling means performs switching between a first hydraulic pump absorption torque characteristic matching the absorption torque of the hydraulic pump with the output torque of the engine at the specified engine output torque point and a second, different hydraulic pump absorption torque characteristic matching the absorption torque of the hydraulic pump with the output torque of the engine at an engine output torque point different from the specified engine output torque point, the throttle controlling means changes, in synchronization with the switching, the engine speed under the no-load condition according to a difference between an engine speed corresponding to the specified output torque point and an engine speed corresponding to the different engine output torque point.

13. A hydraulic drive device for a hydraulic excavator, the hydraulic excavator including a travel device, travel operating levers for operating the travel device, a swing device, a work implement and implement operating levers for operating the swing device and the implement, the hydraulic drive device comprising:

an engine;

a hydraulic pump driven by the engine;

a hydraulic actuator operated by pressure oil discharged from the hydraulic pump, the hydraulic actuator driving the travel device, the swing device and the implement;

operating condition identifying means for identifying operating conditions of the hydraulic excavator; and hydraulic pump controlling means for controlling absorption torque of the hydraulic pump;

wherein when the operating condition identifying means identifies a specific operating condition that satisfies the following operating characteristics (1) to (6), the hydraulic pump controlling means controls the absorption torque of the hydraulic pump to match an output torque of the engine at a specified engine output torque point at which a fuel consumption rate of the engine is minimum:

(1) the implement operating levers and the travel operating levers are not in neutral positions,
(2) a travel operation is not carried out,
(3) a working mode is a heavy excavation mode,
(4) a swing operation of upper structure is not carried out by means of the swing device,
(5) an arm and a bucket of the implement are operating, and
(6) a discharge pressure of the hydraulic pump is less than a specified pressure and an operating amount of the lever associated with the operation of the arm and the bucket is less than a specified amount.

14. The hydraulic drive device for a hydraulic excavator according to claim 13, wherein:
  the operating condition identifying means comprises at least one of operation status detecting means for detecting an operation status of the hydraulic actuator and discharge pressure detecting means for detecting discharge pressure of the hydraulic pump; and
  the operating condition identifying means identifies the operating conditions based on at least one of a detection result provided by the operation status detecting means and a detection result provided by the discharge pressure detecting means.

15. The hydraulic drive device for a hydraulic excavator according to claim 13,
  wherein the hydraulic pump controlling means gradually performs switching between a first hydraulic pump absorption torque characteristic and a second, different hydraulic pump absorption torque characteristic, the first hydraulic pump absorption torque characteristic matching the absorption torque of the hydraulic pump with the output torque of the engine at the specified engine output torque point, the second hydraulic pump absorption torque characteristic matching the absorption torque of the hydraulic pump with the output torque of the engine at an engine output torque point different from the specified engine output torque point.

16. The hydraulic drive device for a hydraulic excavator according to claim 13, further comprising:
  throttle controlling means for controlling an engine speed under a no-load condition,
  wherein when the hydraulic pump controlling means performs switching between a first hydraulic pump absorption torque characteristic matching the absorption torque of the hydraulic pump with the output torque of the engine at the specified engine output torque point and a second, different hydraulic pump absorption torque characteristic matching the absorption torque of the hydraulic pump with the output torque of the engine at an engine output torque point different from the specified engine output torque point, the throttle controlling means changes, in synchronization with the switching, the engine speed under the no-load condition according to a difference between an engine speed corresponding to the specified output torque point and an engine speed corresponding to the different engine output torque point.

* * * * *